United States Patent

Mark et al.

[15] 3,636,530

[45] Jan. 18, 1972

[54] NONVOLATILE DIRECT STORAGE BISTABLE CIRCUIT

[72] Inventors: John G. Mark, Pasadena; Andrew C. Tickle, Chatsworth, both of Calif.

[73] Assignee: Litton Systems, Inc.

[22] Filed: Sept. 10, 1969

[21] Appl. No.: 866,058

[52] U.S. Cl. ..........................340/173 FF, 307/238, 307/279
[51] Int. Cl. ..........................G11c 11/40
[58] Field of Search ..........................307/238, 279; 340/173 FF; 317/235

[56] References Cited

UNITED STATES PATENTS 3,387,286 6/1968 Dennard ..........................340/173
3,447,137 5/1969 Fever ..........................340/173
3,541,531 11/1970 Iwersen ..........................340/173

*Primary Examiner*—Terrell W. Fears

[57] ABSTRACT

A bistable electrical circuit incorporating semiconductor-insulator devices as load resistors in the amplifying (switching) sections of the bistable circuit. The semiconductor-insulator devices exhibit memory properties, and the binary state of the flip-flop at the time of application of a write signal is nonvolatilely stored thereby. Upon application of a read signal the circuit is initialized to the same state as existed during the writing mode of operation. Data storage is maintained in the absence of all applied power.

18 Claims, 10 Drawing Figures

INVENTORS
ANDREW C. TICKLE
JOHN G. MARK
BY

Lawrence V. Link Jr.
ATTORNEY

Fig.2
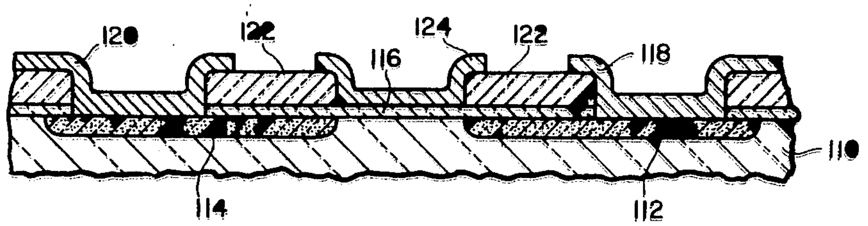
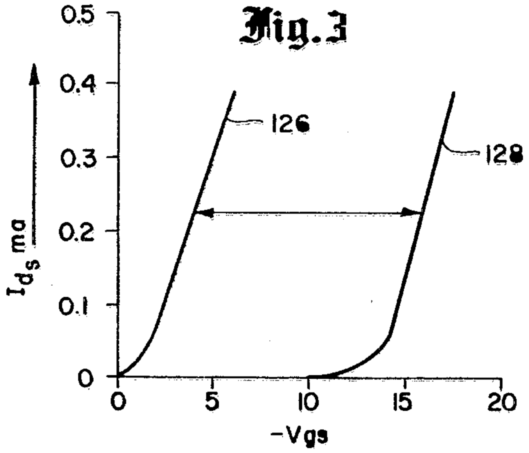
Fig.4
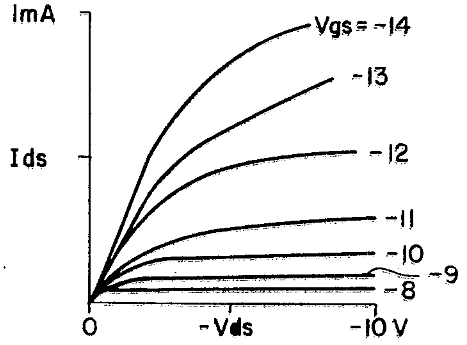
Fig.5
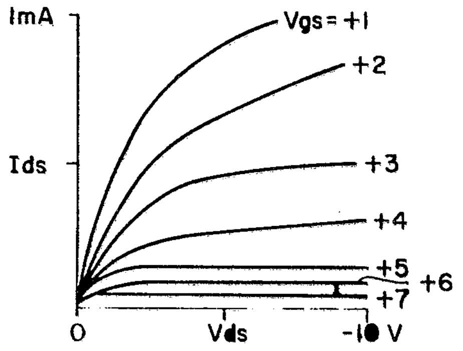
Fig.6
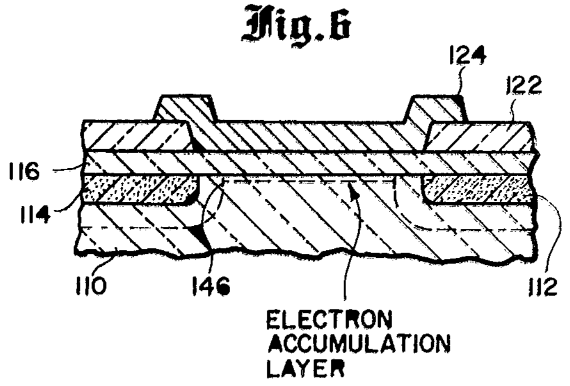
Fig.7
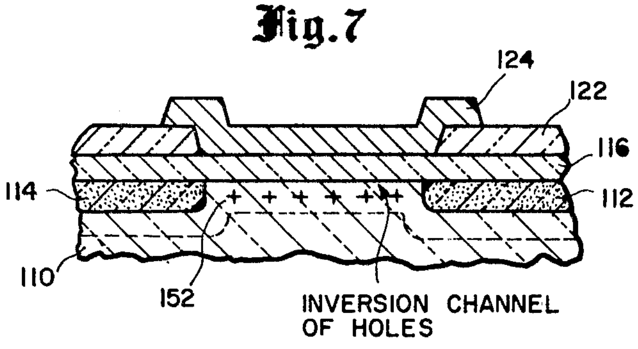
INVENTORS
ANDREW C. TICKLE
JOHN G. MARK
BY
Lawrence V. Link Jr.
ATTORNEY

INVENTORS
ANDREW C. TICKLE
JOHN G. MARK
BY

Lawrence V. Link Jr.
ATTORNEY

NONVOLATILE DIRECT STORAGE BISTABLE CIRCUIT

CROSS-REFERENCES TO RELATED APPLICATIONS

This application is related to U.S. Pat. application Ser. No. 856,607, filed Sept. 10, 1969 entitled, "Metal-Nitride-Semiconductor Memory" by William L. Paterson and Andrew C. Tickle; and U.S. Pat. application Ser. No. 856,607, filed Sept. 10, 1969 entitled "Bistable Electrical Circuit with Non-Volatile Storage Capability" by Andrew C. Tickle. Both of the just-referenced applications were filed on the same date as the subject application.

BACKGROUND OF THE INVENTION

This invention relates generally to bistable electrical circuits with nonvolatile storage, and particularly to a flip-flop circuit that may be initialized to the same binary state as the state of the flip-flop at the time of the application of a previously applied write signal.

Bistable electrical circuits, such as the flip-flop, are commonly used as binary information storage devices in data systems. These devices have the advantage that their electrical state may be changed rapidly by a small input of electrical energy and they are active devices yielding a large power gain. The advent of large-scale integration for microminiature semiconductor devices made flip-flops particularly attractive as data storage devices; and when constructed from field-effect transistors they have the additional advantage of low power consumption.

Prior art flip-flop circuits have a serious disadvantage in that continuous power is required while data is being stored and an interruption in the power source causes loss of the stored data. Further, if prior art flip-flop circuits are utilized as basic building blocks of digital counters and registers, each stage of the counter or register must be initialized each time prime power is interrupted.

Heretofore, the most commonly used media for nonvolatile storage, (i.e., data storage over an extended period of time without the consumption of power) have been mechanical or magnetic devices. Mechanical means such as punchcards and papered tapes are extremely cheap but are slow, bulky and nonerasable. Magnetic tapes, drums and discs are considerably faster, although their sequential mode of access makes their effective speed too slow for many applications. Also, the reliability of magnetic tapes, drums and discs is less than fully electronic systems. Memory systems using ferrite cores and magnetic films provide reliable, high-speed, nonvolatile storage of data; but have a number of disadvantages such as high power consumption and stringent requirements on the driving electronics. Various ferroelectric materials, which exhibit hysteresis characteristics analogous to those of ferromagnetic materials, have been investigated in the search for a nonvolatile storage media that avoids the disadvantages of magnetic systems. However, no ferroelectric material has been found to date which can be reliably used as a nonvolatile storage media.

SUMMARY OF THE INVENTION

In accordance with one preferred embodiment of the subject invention semiconductor-insulator devices are coupled so as to function as load resistors in the amplifying sections of a bistable circuit, such as a flip-flop circuit having first and second stable states. Each semiconductor-insulator device exhibits memory properties in response to write signals of a first amplitude and polarity, whereby the conduction characteristics of the semiconductor-insulator device vary as a function of the state of the flip-flop circuit at the time of application of the write signal. In response to read signals, the memory devices cause asymmetrical impedance characteristics in the different amplifying sections of the flip-flop; whereby the flip-flop is initialized to the same state it was in when the last write signal was applied to the memory devices. The binary information is nonvolatilely stored by the semiconductor-insulator devices, but may be erased by application of an erase pulse. The writing and erasing operation does not effect the normal logic mode of operation of the flip-flop, and in accordance with the subject invention the erase, read and write cycle may be accomplished in a matter of tenths of a microsecond.

The nonvolatile storage capabilities of the flip-flop circuit, of the subject invention, results from a recently discovered characteristic of certain insulated-gate field-effect transistors, hereinafter referred to as IGFETs. For example, when a layer of silicon-nitride is used as the dielectric between the gate electrode and the substrate of an IGFET the threshold voltage, $V_t$, of the resulting metal-nitride-silicon (MNS) insulated-gate field-effect transistor may be shifted many volts by the application of a sufficiently large electric field of a first polarity across the silicon-nitride dielectric layer. This shift in threshold voltage has been found to be quasi-permanent, and recovery under zero applied field occurs with a time constant of the order of months or years. The application of a sufficiently large electric field of a second polarity restores the threshold voltage to its initial value within time periods of a few hundred nanoseconds.

The mechanism by which the threshold voltage may be shifted in the MNS IGFET (metal-nitride-silicon insulated-gate field-effect transistor) is believed to be the tunneling of charge across the semiconductor-insulator interface. Because of the energy barrier at the interface, the probability of charge tunneling across it is extremely small under conditions of zero applied field, even though appropriate states may exist in the insulator. When a large electric field is applied across the insulator the probability of tunneling to and from states in the insulator close to the interface is increased by many orders of magnitude. When charge is removed from the semiconductors and stored in the insulator in this manner, the shift in the threshold voltage, $V_t$, is a function of the amount of charge stored at the semiconductor-insulator interface. In flip-flop circuits according to the principles of the subject invention, the just-described shift in threshold voltage, $V_t$, of the MNS transistors is utilized by coupling a MNS transistor as a load resistor in each of the amplifying (switching) sections of a bistable circuit. The threshold voltage of only one of the MNS transistors will be substantially shifted upon the application of a write signal. The determination of which MNS transistor will experience a shift in threshold voltage is a function of the state of the flip-flop at the time of application of the write voltage. Upon application of a read signal the varying threshold levels of the different MNS devices result in asymmetrical impedance characteristics for the different sections of the bistable circuit such that the circuit switches to the same state as existed upon the application of the last write signal.

Flip-flop circuits which have nonvolatile storage capability and which may be initialized to the state existing during a previous writing period have numerous applications in data storage units and computer arithmetic units, such as for initializing a memory section or an arithmetic register to a preselected value.

It is therefore an object of the subject invention to provide a bistable electrical circuit capable of direct, nonvolatile storage of binary information.

Another object of the invention is to provide a bistable electrical circuit capable of nonvolatile storage of binary information, and of being selectively initialized to the state of the circuit at the time the binary information was stored.

Still another object is to provide a bistable electrical circuit capable of performing normal binary information storage in a logic mode of operation; of permanently storing a selected one of two binary states, even in the absence of prime power; and of being automatically initialized to said permanently stored state upon reapplication of prime power.

A further object of the invention is to provide an improved flip-flop circuit which may be set to either one of two stable states in a normal logic mode of operation; which responds to a write signal to permanently store the stable state exhibited by the circuit upon application of the write signal; and which responds to a read signal to initialize the flip-flop circuit to the selected state.

A still further object is to provide a bistable electrical circuit capable of performing normal binary logic storage and which, after an interruption of prime power, may be automatically reset to the state existing during application of a write signal prior to the power interruption.

BRIEF DESCRIPTION OF THE DRAWINGS

The novel features which are characteristic of the invention, both as to its organization and method of construction and operation, together with further objects and advantages thereof will be better understood from the following description taken in conjunction with the accompanying drawings in which the illustrative embodiments of the invention are disclosed. It is to be expressly understood, however, that the drawings are for the purpose of illustration and description only and do not define limitations of the invention.

In the drawings:

FIG. 2 is a cross-sectional view of a metal-nitride-silicon insulated-gate field-effect transistor that may be utilized in the bistable electrical circuits of the subject invention.

FIG. 3 is a graph of drain current vs. the voltage between the gate and source elements of a metal-nitride-silicon transistor, for explaining the nonvolatile data storage capability of the transistor.

FIGS. 4 and 5 are graphs of drain current vs. the voltage between the drain and source elements of a metal-nitride-silicon transistor for further explanation of the storage capability of the transistor.

FIGS. 6 and 7 are cross-sectional views of a metal-nitride-silicon transistor for explaining the various modes of operation of the transistor.

DESCRIPTION OF THE PREFERRED EMBODIMENTS

Figure 1:
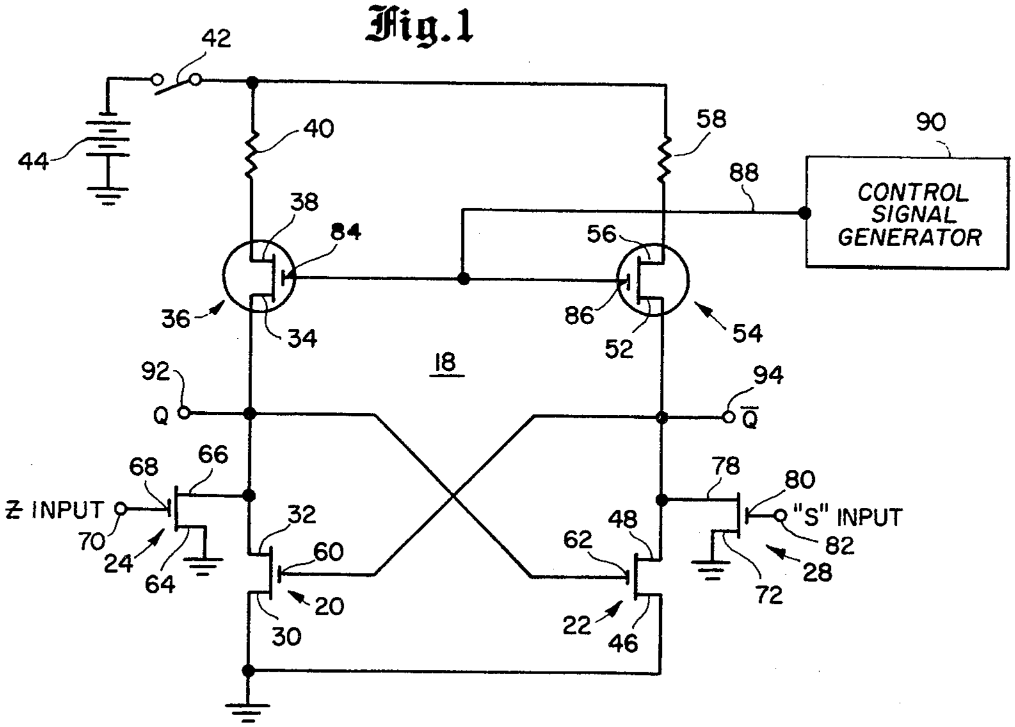
FIG. 1 is a schematic and block diagram of a direct restoring flip-flop circuit with nonvolatile storage capabilities according to the principles of the subject invention.

Referring now to the drawings, one preferred embodiment of a direct restoring flip-flop circuit having nonvolatile storage capabilities, shown in FIG. 1, will be described first. An understanding of the unique features of this circuit will provide a basis for the subsequent explanation of the more sophisticated direct restoring flip-flop circuits of FIGS. 9 and 10.

Referring now primarily to FIG. 1, the flip-flop circuit 18 includes signal translating devices 20, 22, 24 and 28, which devices may be metal-oxide-silicon insulated-gate field-effect transistors, hereinafter referred to as MOS IGFETs. In the embodiment shown in FIG. 1, the MOS IGFETs are P channel on N substrate types. However, it will be understood that the particular type of signal-translating devices comprising the basic flip-flop circuit are not critical to the subject invention and any suitable signal-translating device may be utilized. The basic flip-flop circuit illustrated in FIG. 1 is a rudimentary circuit selected by way of illustration so that the subject invention may be more clearly explained. It will be understood, however, that the subject invention is not limited to the particular basic flip-flop circuit incorporated therein, but may be readily adapted to any bistable electrical circuit.

The transistor 20 has a source terminal 30 coupled to ground and a drain terminal 32 connected to a source terminal 34 of a metal-nitride-silicon insulated-gate field-effect transistor 36. A drain terminal 38 of the MNS IGFET 36 is coupled through a resistor 40 and a switch 42 to a source of direct current (DC) potential 44. The transistor 22 has a source terminal 46 connected to ground, and a drain terminal 48 connected to a source terminal 52 of a metal-nitride-silicon insulated-gate field-effect transistor 54. A drain terminal 56 of the MNS IGFET 54 is coupled through a resistor 58 and the switch 42 to the source 44. A gate terminal 60 of the transistor 20 is connected to the drain terminal 48 of the transistor 22; and a gate terminal 62 of the transistor 22 is connected to the drain terminal 32 of the transistor 20.

The transistor 24 has a source terminal 64 connected to ground, a drain terminal 66 connected to the drain terminal 32 of the transistor 20, and a gate terminal 68 connected to a "Z" input terminal 70. The transistor 28 has a source terminal 72 connected to ground, a drain terminal 78 connected to the drain terminal 48 of the transistor 22, and a gate terminal 80 connected to an "S" input terminal 82.

Figure 8:
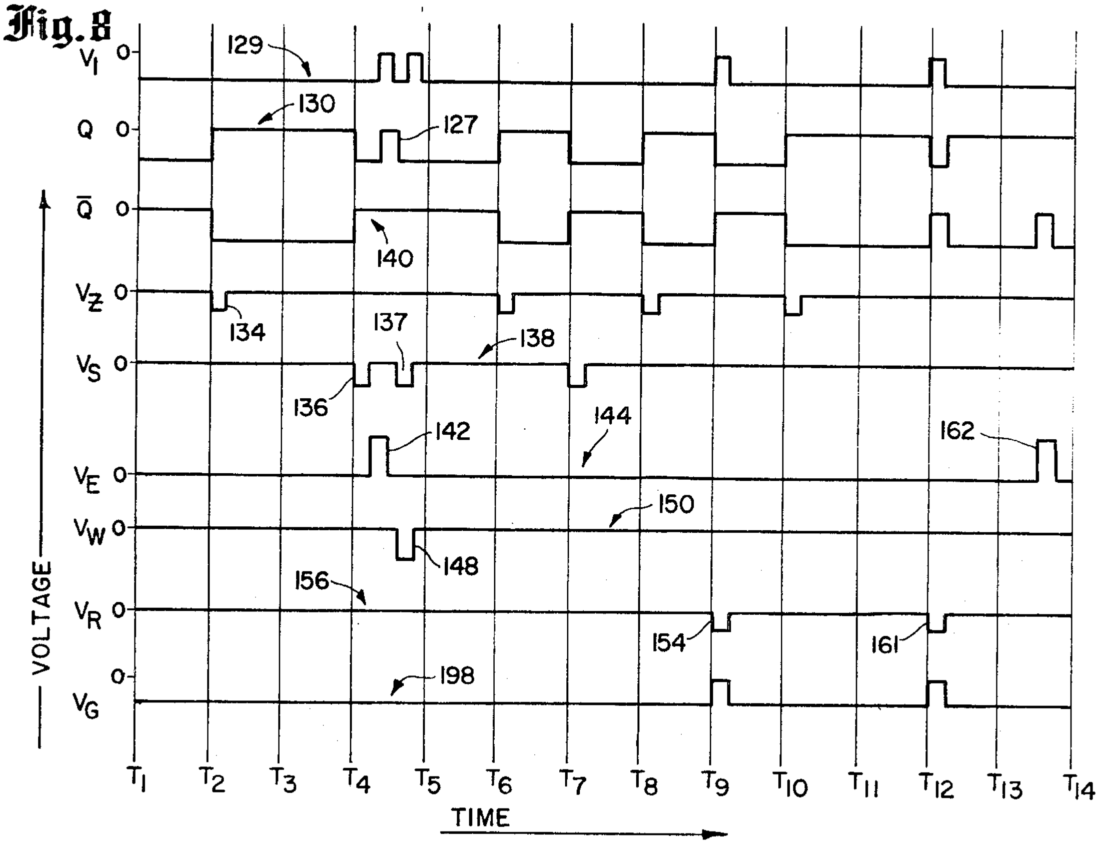
FIG. 8 is a graph of voltage amplitude vs. time for explaining the operation of the various bistable electrical circuits with nonvolatile storage of the subject invention.

Gate terminals 84 and 86 of the MNS IGFETs are coupled in parallel by a lead 88 to a control signal generator 90. The control signal generator 90 may be any of numerous conventional types adapted to generate the control signals which will be explained in detail hereinafter, and which are depicted in FIG. 8.

In a normal logic mode of operation a signal $V_1$ is applied to the gate terminals 84 and 86 from the control signal generator 90. The signal $V_1$ is of sufficient negative magnitude so that the impedance of the transistor devices 36 and 54 is small compared to the resistance value of resistors 40 and 58. As will be apparent as the description proceeds, in the circuit 18 the transistor devices 36 and 54 operate in the circuit as load resistors with memory properties.

Transistors 20 and 22 form inverting amplifiers cross-coupled in a regenerative switching arrangement whereby the circuit 18 has two stable states, "Zero" and "Set." In the "Set" state the transistor 20 is cut off (nonconducting) and the transistor 22 is conducting at or near its saturation level. Therefore, in the "Set" state the signal Q, at an output terminal 92, is substantially at the potential of the source 44, which potential level may be considered a binary "One." In the "Set" state the complementary output signal $\overline{Q}$, at an output terminal 94, is substantially at ground potential, which potential may be considered a binary "Zero." Conversely, in the "Zero" state the transistor 22 is substantially cut off and the transistor 20 is conducting at or near its saturation level. In the "Zero" state the signal Q at the terminal 92 represents a binary "Zero" and the signal $\overline{Q}$ at the terminal 94 represents a binary "One."

In the embodiment shown in FIG. 1, during the normal logic mode of operation, a ground potential applied to the gate electrode of the conducting transistor of the transistor pair 20 and 22 initiates the reversal of conductive states. A ground potential may be applied to the gate terminal of transistors 20 or 22 by applying a low-level negative triggering pulse to the gate terminals of transistors 28 or 24 respectively. If for example, the flip-flop circuit is in the "Set" state and a negative triggering pulse is applied to the "Z" input terminal 70, the transistor 24 applies a momentary ground potential to the gate terminal 62 of the transistor 22. In response to the ground potential applied to gate terminal 62, the transistor 22 starts to turn off (i.e., conduction is reduced) causing the potential at the drain 48 to increase in a negative direction thereby causing the transistor 20 to be turned on (i.e., start to conduct). Once the state reversal has been initiated by the input switching pulse, the flip-flop configuration is such that the reversal of conductive states continues without any further input signal.

To return to the "Set" state a low-level negative signal is applied to the "S" input terminal 82 of the transistor 28. In response to this signal the transistor 28 applies to a momentary ground potential to a gate terminal 60 of the transistor 20 thereby reversing the conductive state of the transistors 20 and 22 in a manner similar to, but opposite from that just described for initiating the "Zero" state.

The nonvolatile storage operation of the flip-flop circuit of FIG. 1 may be better understood by first examining some of the characteristics of a metal-nitride-silicon insulated-gate field-effect transistor, such as the transistors 36 and 54. The construction of a selected metal-nitride-silicon insulated-gate field-effect transistor is shown in the cross-sectional view of FIG. 2. The basic structure of the device of FIG. 2 comprises P+-type regions or channels 112 and 114 formed into an N-type silicon substrate 110. A silicon-nitride film 116 is formed over the surface of the substrate 110, leaving openings for a metallic drain electrode 118 to contact the P+-type region 112 and for a source electrode 120 to contact the P+-type region 114. The silicon-nitride film 116 is covered with a silicon-dioxide sheeting 122 leaving openings for the electrodes 118 and 120 and for a gate electrode 124 which contacts the silicon-nitride film 116. In one MNS device suitable for utilization in the circuits of the subject invention, and adapted for a large-scale integration, the silicon-nitride film 116 may be in the order of 700 to 1,400 angstroms thick, and the gap between the source and drain regions 114 and 112 respectively, may be on the order of 10 microns.

The following method has been successfully utilized in producing MNS IGFETs suitable for the subject invention. However, it is understood that the invention is not limited to the devices produced by this method, but encompasses all semiconductor-insulator devices, regardless of how manufactured, within the scope and spirit of the claims.

The substrate 110 may be phosphorous doped silicon which is prepared by lapping, etching, polishing, etching; and is then alkali cleaned followed by a deionized water wash. The P+ regions or channels 112 and 114 are formed by conventional boron diffusion (diborine) using a thermally grown oxide as a mask. Next the oxide diffusion mask is dissolved in buffered hydrofluoric acid and the silicon surface is then water washed, soap scrubbed, water washed, alkaline cleaned, washed in deionized water and dried in nitrogen.

The cleaned wafers are next placed on a quartz surface in an RF induction furnace and subject to an RF discharge cleaning for approximately 7 minutes at about 200° C. Silicon-nitride film 116 is deposited by the ammoniation of silane at 900° C. with the following flow rates: $SiH_4$ at 8 cm.$^3$/min., $NH_3$ at 850 cm.$^3$/min.; and deposition of $Si_3N_4$ occurs at approximately 100 to 2,000 angstroms/min.

The silicon-dioxide sheeting 122 is also performed in an RF furnace by oxidation of silane. For the deposit of the silicon dioxide the flow rates are: $0_2$ at 80 cm.$^3$/min., $SiH_4$ at 8.0 cm.$^3$/min., $N_2$ at 10 liter/min. Initial temperature during this step is 700° C. and nucleation begins almost immediately when the $SiH_4$ is started. The wafer temperature is then lowered to 400° C. and approximately 7,000 angstroms of $Si0_2$ is deposited at 500 angstroms/min.

Next, the top layer of $Si0_2$ is etched by standard procedures to form a mask for the etching of the underlying $Si_3N_4$. The $Si_3N_4$ is etched in a concentrated reagent grade phosphoric acid at 180° C. Then the $Si0_2$ mask is dissolved and the metal electrodes 118, 120 and 124 attached by standard procedures.

If the just-described MNS devices have been prepared under atmospheric condition, a minute layer of silicon-oxide may be formed between the substrate 110 and the silicon-nitride film 116. This oxide layer may be removed by heating the substrate 110 in a vacuum or reduced atmosphere, however, it has been noted that a minute layer of silicon-oxide may enhance the desired controllably threshold voltage shift of the MNS devices.

As explained previously, the threshold voltage, $V_t$, of a field-effect transistor is the potential difference which must be applied between the gate and the source electrodes to cause the onset of substantial current conduction between the drain and the source electrodes. While the threshold voltage of a metal-oxide-silicon IGFET is substantially constant, it has been recently discovered that when silicon-nitride is used as the dielectric between the gate electrode and the substrate, instead of silicon dioxide, the threshold voltage may be shifted by many volts by the application of a sufficiently large electric field across the dielectric film. This shift in the threshold voltage, $V_t$, which occurs in metal-nitride-silicon transistors, is semipermanent in the absence of a second applied electric field, and recovery occurs with a time constant on the order of months or years. The application of an electric field of sufficient magnitude and of a second predetermined polarity across the dielectric layer of the MNS devices acts to restore the threshold voltage to its initial value in a time period of a few hundred nanoseconds.

FIG. 3 shows the transfer characteristic of a MNS semiconductor-insulator device after electric fields of first and second magnitudes and polarities have been applied across the silicon-nitride dielectric film 116 (FIG. 2). The ordinate in the graph of FIG. 3 ($I_{ds}$) is the current flowing between the source and drain terminals and the abscissa ($V_{gs}$) is the voltage applied between the gate and source terminals of the MNS device. Curves 126 and 128 could represent, for example, the transfer characteristics of one particular MNS device after potential of a +40 voltage and a −30 voltage, respectively, have been applied across the dielectric film 116. After the application of the positive potential, the threshold voltage, $V_t$, is a least negative voltage and after the application of the negative potential, the threshold, $V_t$, is shifted to a more negative value. For the particular MNS device associated with the transfer characteristics of FIG. 3, and for the potentials stated above, the transfer characteristics are shifted approximately 12 volts in the negative direction upon the application of a large negative potential across the dielectric film.

FIGS. 4 and 5 are graphs of the current flow between the drain and source electrodes of an MNS device plotted against the voltage between the drain and source electrodes ($V_{ds}$) for different values of potential applied between the gate and source electrodes ($V_{ds}$). In FIG. 4 a negative potential, for example, a negative 30 volts, has been initially applied across the dielectric film resulting in a threshold voltage, $V_t$, of a negative 8 volts. In FIG. 5 a positive potential of 40 volts, for example, had initially been applied across the dielectric film resulting in a threshold voltage, $V_t$, of +4 volts. The shape of the characteristic curves as shown in FIGS. 4 and 5 are independent of the value of the threshold voltage, $V_t$, and thus the effect of applying the strong positive and negative fields across the dielectric layer 116 is characterized completely by specifying the value of the threshold voltage, $V_t$.

Operation of the direct restoring flip-flop circuit having nonvolatile storage capabilities, shown in FIG. 1, is initiated by closing switch 42 so as to apply prime power to the circuit 18. The potential of the DC power source 44 may be a negative 20 volts, for example.

It is noted that the substrates of transistors 20, 22, 24, 28, 36 and 54 may all be connected to the ground potential plane.

In the normal logic node of operation control signal generator 90 applies the voltage $V_1$ (logic mode control signal) on the lead 88 to the gate terminals 84 and 86 of the MNS IGFETs 36 and 54 respectively. During the normal logic mode of operation the potential of the signal $V_1$ is selected so that both transistor devices 36 and 54 are conducting heavily; hence their impedance is small compared to that of the corresponding fixed load resistors 40 and 58 respectively. The signal $V_1$ is depicted in a waveform 129 of FIG. 8 and for transistor devices such as those characterized by the transfer curves of FIG. 3 the value of the signal $V_1$ may be selected at a negative 15 volts for example.

Preferably, during the normal logic mode of operation the transistor devices 36 and 54 have an insignificant effect on the operation of the flip-flop circuit 18; and these devices cause only a small addition to the value of the circuits effective load resistance. In the normal logic mode of operation, the flip-flop functions in a conventional manner in response to triggering signals applied to the "S" input terminal 82 and to the "Z" input terminal 70. For example, referring to the waveforms of FIG. 8, if at time $T_1$ the flip-flop circuit of FIG. 1 was initially in the "Set" position, a signal Q, at the output terminal 64, would be a binary "One" (indicated by a negative potential level) as shown in waveform 130. Upon application of a negative triggering pulse 134 ($V_z$) at time $T_2$ to the "Z" input terminal 70, the flip-flop circuit is switched to the "Zero" state and the output signal Q switches to a binary "Zero" (substantially ground potential). Upon application of a negative triggering pulse 136, of waveform 138 ($V_s$), at time $T_4$ the flip-flop circuit is returned to the "Set" state; and the signal Q to the binary "One" potential level. The signal $\overline{Q}$ is shown by a waveform 140 as the complementary signal to the signal Q depicted in waveform 130.

To initiate the storage mode of operation the MNS transistors 36 and 54 are first set to the threshold condition depicted by the waveform 126 of FIG 3. In this clear or erase mode of operation a large positive pulse, for example, of a magnitude of a +40 volts, is applied to the lead 88 from the signal generator 90. One such erase pulse 142 of waveform 144 ($V_E$) is shown in FIG. 8 as being applied between time periods $T_4$ and $T_5$. It is noted that in the embodiment of the flip-flop circuits shown in FIG. 1, that the application of the erase pulse $V_E$ to the gate elements of the memory transistors 36 and 54 will introduce a transient into the output signals Q and $\overline{Q}$ momentarily causing both output signals to indicate a zero level (see pulse 127 of waveform 130). Therefore, a trigger pulse (in the present example a $V_s$ pulse 137) is applied to the circuit 18 immediately following the application of the erase pulse 142, to ensure that the circuit is reset to the desired state. In the more refined embodiment of the subject invention, shown in FIG. 10, this just-described condition is eliminated and the state of the flip-flop circuit is not effected by the application of the erase signals.

The effect of applying the erase pulse 142 to the gate electrodes of the MNS IGFET is illustrated in the cross-sectional view of FIG. 6, wherein an electron accumulation layer 146 is shown as formed at the interface surface between the substrate 110 and the dielectric or insulator film 116. The applied field causes the threshold value, $V_t$, to shift to a less negative value.

In the write mode of operation a negative pulse such as pulse 148 of waveform 150 ($V_w$) is applied to the lead 88 from the control signal generator 90. In response to this negative potential applied to the gate electrodes of the MNS IGFET devices an inversion channel of holes, such as channel 152 of FIG. 7 is formed between the source element 114 and the drain element 112 of the transistor. It is important to note that due to the inversion channel of holes 152 that the potential of the substrate at the interface between the substrate 110 and the dielectric layer 116 is a function of the potential applied to the source and drain electrodes of the MNS devices.

For the situation depicted in FIG. 8, at the time of the application of the write pulse 148, the source electrode of the transistor 36 is substantially at the potential of the source 44, for example, a negative 20 volts. This is due to the fact that at the time of the application of the write pulse 148 the flip-flop circuit was in the "Set" condition as indicated by the signal Q of the waveform 130. By the same token, the potential of the source electrode 52 of the transistor 54 is substantially at ground potential at the time of application of write pulse 148, because the transistor 22 is conducting at or near the saturation level. Therefore, if the potential of the write pulse 148 were a negative 30 volts, for example, there would be only a negative 10 volts appearing across the dielectric layer of the transistor 36. This is because the source terminal 34 of this transistor was at a negative 20 volts and the inversion layer directly beneath the dielectric 116 couples the dielectric-substrate interface to the same electrical potential as the source terminal. However, since the source terminal 52 of the transistor 54 is substantially at ground potential there will be approximately a negative 30 volts applied across the dielectric film 116 of the transistor 54. As explained previously, it is a characteristic of insulated-gate field-effect transistors having silicon-nitride as a dielectric to experience a shift in threshold voltage, $V_t$, upon the application of a large negative potential across the dielectric film. However, the shift in threshold voltage does not occur if the negative potential is below a selected value. For the devices herein illustrated, a negative 10 volts applied across the dielectric film does not produce a significant shift in the threshold value; whereas a potential in the order of a negative 30 volts will effect a shift in the threshold voltage as illustrated by the separation between the curves 126 and 128 of FIG. 3.

Also, it should be noted that although the application of the write pulse 148 of the waveform 150 effects a change in the characteristics of the silicon-nitride devices 36 or 54, that the application of a write pulse does not effect the state of the basic flip-flop circuit because during the write mode of operation the resistance of these devices is small compared to that of load resistors 40 and 58.

After termination of the write pulse, the information representing the state of the flip-flop at the time of the application of the write signal 148 is permanently stored and is independent of subsequent states of the flip-flop circuit and of the absence of applied prime power.

When it is desired to set the flip-flop circuit to the same state as existed at the time of the application of the write pulse 148, a negative pulse such as pulse 154 of the waveform 156 ($V_R$) is applied to the lead 88 from the control signal generator 90. The pulse 156 is of an amplitude between the threshold values, $V_t$, of the two states of the MNS IGFET devices. For example, referring to FIG. 3, the amplitude of the read pulse 154 could be selected at approximately a negative 6 volts so that one of the MNS transistors will conduct more than the other causing an unbalance in the basic flip-flop sufficiently to produce the desired change in state, to the state exhibited by the circuit 18 upon application of the write pulse 148.

Therefore, in response to the read pulse 154 applied to the lead 88, the transistor 36 would be conducting heavily resulting in a large negative potential being applied to the gate terminal of the transistor 22, hence causing that transistor to conduct. On the other hand, the read pulse 154 applied to the transistor 56 would at best induce small conductivity due to the more negative threshold value imparted to the transistor 54 during the write period.

After the signal applied to lead 88 returns to the level $V_1$, the asymmetry introduced by the memory devices 36 and 54 is sufficiently small so that it may be overridden by trigger signals $V_z$ or $V_s$, as shown at time period $T_{10}$ in FIG. 8; and normal logic operation of the circuit may be resumed. Also, it should be noted that at any time prior to the application of the next erase pulse, such as erase pulse, 162 of waveform 144, the circuit may be returned to the state it was in at the time of the application of the last write pulse by applying a read pulse, such as read pulse 161 of waveform 156.

The signal $V_1$, applied to the gate electrodes of the memory devices 36 and 54 during the normal logic mode of operation, is selected so that the resistance value of the devices 36 and 54 is small compared to the load resistors 40 and 58; even though one of the memory devices 36 or 54 may have a larger threshold value resulting from a previous writing operation. However, the value of $V_1$ must not be sufficiently negative to cause appreciable writing during the logic mode of operation when either memory device 36 or 54 is at ground potential. This just-described design comprises results in some difficulty in selecting the parameters for the circuit of FIG. 1.

Figure 9:
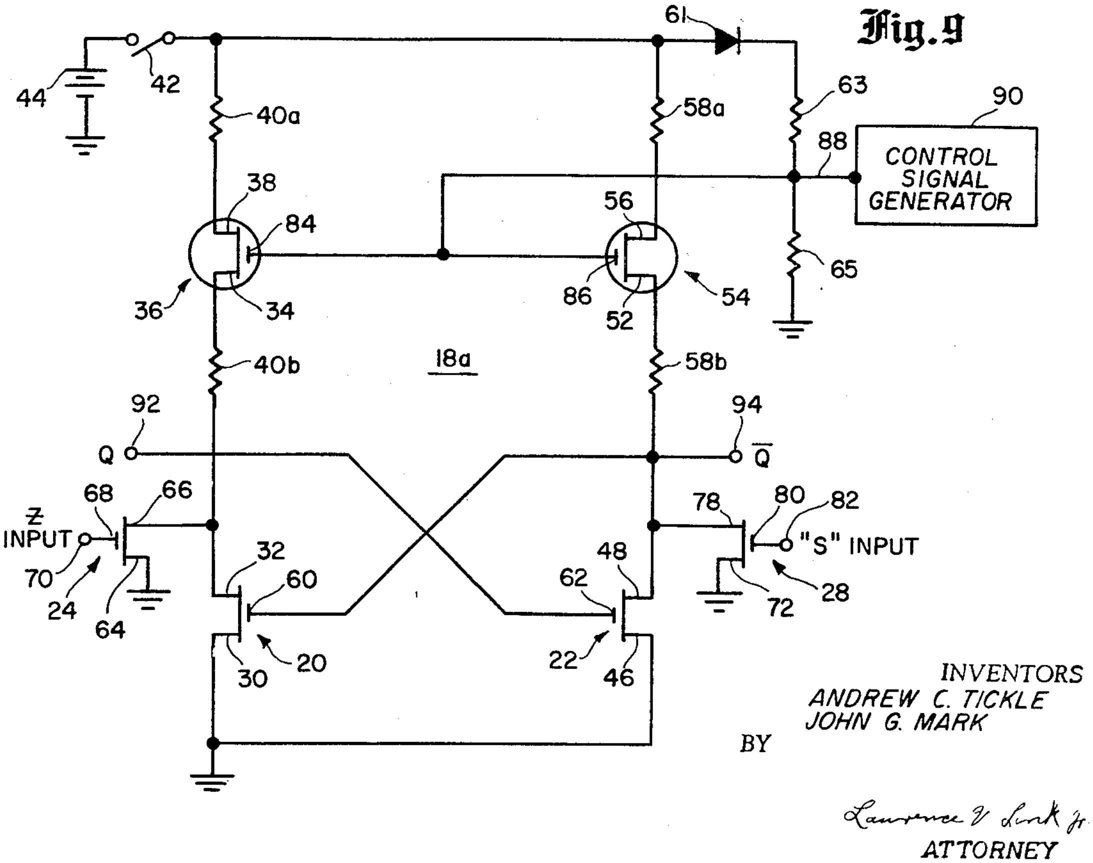

The direct restoring flip-flop circuit 18*a* of FIG. 9 is similar in structure to the circuit of FIG. 1, but has been found to exhibit an overall increase in performance. In the nonvolatile bistable electrical circuit of FIG. 9, parts which directly correspond to those of FIG. 1 have been assigned like reference numerals so that it will be sufficient to discuss the additional components which provide the increased capabilities of the circuit of FIG. 9.

As just stated, in the design of the flip-flop circuit of FIG. 1, the selection of the voltage $V_1$ requires a compromise between small asymmetry during the logic mode of operation (large negative value for $V_1$) and no spurious writing during the logic mode (small negative potential across the dielectric layer 116). It has been found that by splitting the load resistors 40 and 58 in FIG. 1, into resistors 40*a* and 40*b* and 58*a* and 58*b* respectively, as shown in FIG. 9, the magnitude of the required compromise may be reduced.

Further, the divider network comprising diode 61 and resistors 63 and 65 have been added to the flip-flop circuit 18*a* such that the signal $V_1$ is automatically applied to the lead 88 in the absence of another signal from the control signal generator 90. In this regard it is important to note that after the circuit of FIG. 9 has been processed through an erase, write cycle as explained hereinabove, that the control signal generator 90 is no longer required; and the circuit 18*a* will initialize to the same state as it exhibited during the application of the last write pulse, each time the switch 42 is closed restoring power to the circuit. This feature has numerous practical applications whereby a number of flip-flop circuits, for example, representing stages in a register, may be preset to a selected number. By incorporating the concepts of the invention shown in FIG. 9, this preset number may be permanently stored in the absence of applied power and the register will initialize to the desired state upon application of power thereto.

Figure 10:
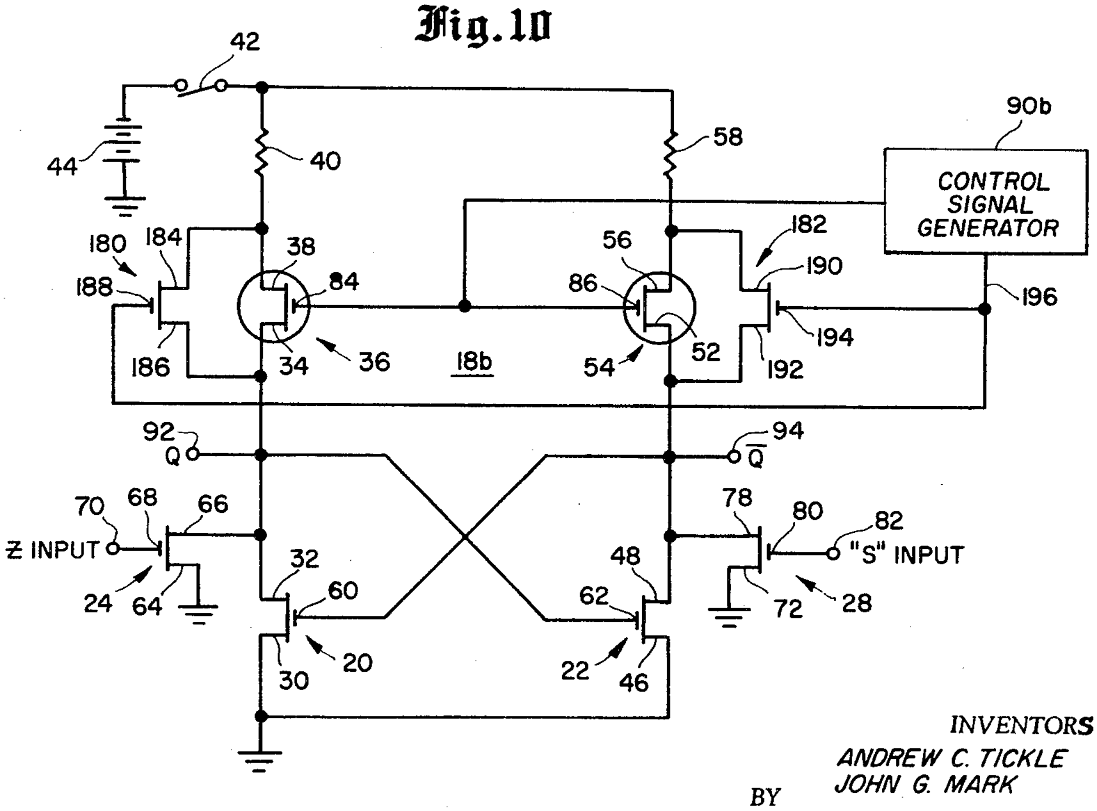
FIGS. 9 and 10 are schematic and block diagrams of other embodiments of direct restoring flip-flops with nonvolatile storage according to the subject invention.

The design compromise between minimum asymmetry in the normal logic mode of operation and of a large safety margin against spurious writing, is not required in the circuit 18*b* shown in FIG. 10. Referring now primarily to FIG. 10, the structure and function of the circuit 18*b* are in many respects identical to those of circuit 18 of FIG. 1, which has been described in detail previously. Therefore, it is sufficient for a clear understanding of the structure and operation of circuit 18*b* to at this point only discuss the modified structural features and the changes in the mode of operation. It should be noted that in FIG. 10 components which are similar or identical to corresponding components in circuit 18 of FIG. 1, are assigned identical reference numerals.

In FIG. 10, conventional switching transistors, such as MOS IGFETs 180 and 182, are coupled across memory transistors 36 and 54 respectively. In particular, the switching transistor 180 has a drain electrode 184 connected to the drain electrode 38 of the memory transistor 36; and the source electrode 186 of the transistor 180 is connected to the source element 34 of the memory device 36. Similarly the transistor 182 has a drain electrode 190 connected to the drain electrode 56 of the memory transistor 54; and the switching transistor 182 has a source electrode 192 coupled to the source electrode 52 of the memory device 54. Gate elements 188 and 194 of the switching transistors 180 and 182 respectively are coupled in parallel to a second output terminal of a control signal generator 90*b* by a lead 196.

The control signal generator 90*b* applies a signal, $V_g$, to the lead 196 and hence to the gate electrodes of the switching transistors 180 and 190. The signal $V_g$ is shown as a waveform 198 in FIG. 8 and consists of a negative potential except during the time periods coincident with the reading pulses, such as pulses 154 and 161 of waveform 156. The negative potential segments of the waveform $V_g$ are sufficient to bias the switching transistors 180 and 182 into a state of heavy conduction, i.e., the transistors 180 and 182 are switched hard on. As noted from waveform 198 the switching transistors bypass the memory devices 36 and 54 during all of the modes of operation of the flip-flop circuit 18*b* except during the time periods coincident with the application of the read pulses. Hence, in the circuit of FIG. 10 the signal $V_1$ is not required by the memory devices during the normal logic mode of operation, since these devices are effectively bypassed during this period. This feature, of having the memory devices bypassed during the normal logic mode of operation, prevents any asymmetry that would be introduced into the circuit by the memory devices from effecting the normal logic operation of the flip-flop circuit 18*b*. The erase pulses $V_E$ may be applied to the memory transistors from the control signal generator 90*b* at any time without affecting the information stored in the flip-flop circuit; and resetting the circuit immediately after the application of an erase pulse, such as by the reset signal 137 described previously, is not necessary. Writing into the memory devices 36 and 54 may be performed at any time and it is not necessary during the writing mode to remove the negative potential to the gating elements of the switching transistors 180 and 182. Writing into the memory devices does not affect in any way the operation of the normal logic mode of the flip-flop circuit. However, it is noted that the application of the write signal, such as write pulse 148, should be timed to occur slightly before the removal of power so that the memory devices may sense the state of the flip-flop circuit before the circuit assumes an unpredictable state due to the drop in supply voltage.

In summary, the operation of the circuit 18*b* involves the application of the signal, $V_g$, to the lead 196 whereby the switching transistors 180 and 182 effectively bypass the memory devices 36 and 54, except during the read mode of operation. The gate electrodes of the memory transistors 36 and 54 may be left at zero potential except during read, write or erase periods. The erase pulse such as erase pulse 142 shown in FIG. 8, may be applied to the memory transistors while they are bypassed by the switching transistors; and therefore the application of the erase pulse does not in any way affect the operation of the flip-flop circuit or introduce a transient pulse, such as transient pulse 127 shown in waveform 130 of FIG. 8, into the output signals of the circuit. Similarly, the write pulse $V_W$ may be applied from the control signal generator 90*b* to the gate elements of the memory transistors while these transistors are effectively bypassed by the switching devices 180 and 182. It is only during the read mode of operation that the switching devices are turned off so that the circuit 18*b* may be set to the desired state, i.e., the state of the circuit during the application of the last preceding write pulse, as a function of the asymmetry introduced into the flip-flop circuit by the memory devices. As explained previously this asymmetry results from the characteristics of metal-nitride-silicon insulated-gate field-effect transistors whereby the conduction characteristics of the devices change as a function of the potential applied across the dielectric layer and this change in characteristics is semipermanent and is maintained in the absence of all applied power to the system.

Thus there has been described a novel and unique bistable electrical circuit which is capable of nonvolatilely storing binary data and of being initialized to the same binary state it held at the time of the application of a previous write pulse. It is noted that in the embodiments described herein that the memory elements have been described in terms of MNS IGFETs. However, it will be understood that any semiconductor-insulator device which exhibits the characteristics shown in FIG. 3 may be utilized in accordance with the principles of the subject invention. Also, the circuits described herein, in the interest of simplicity, have been discussed as comprising discrete components. However, it will be understood by those skilled in the art, that one of the primary advantages of the bistable electrical circuits of the subject invention is that they are readily adaptable to microelectronics and integrated circuit techniques. For example, resistors 40 and 58 may be MOS IGFETs, with the gate electrodes connected to the drain electrodes, so that all of the components may be formed on a single chip or substrate. Still further, the transistors discussed herein have been illustrated as devices comprising P channels in N substrates. However, it will be apparent to those skilled in the art that N channels on P substrate devices could be utilized in accordance with the principles of the subject invention with the proper reversal of the polarity of supply voltages and input signals.

It is understood that the above-described arrangements are illustrative of the application of the principles of the invention. Numerous other arrangements may be devised by those skilled in the art without departing from the spirit and scope of the invention. Accordingly, it is to be understood that the present invention is only to be limited by the spirit and scope of the appended claims.

What is claimed is:

1. A bistable electrical circuit adapted to assume a selected one of two stable states in response to trigger signals applied thereto, to store the state of the circuit at the time of application of a write signal, and to switch said circuit to the stored state upon application of a read signal; said bistable circuit comprising:

a first circuit section having a primary current path which includes a signal-translating device;

a second circuit section having a primary current path which includes a signal-translating device;

means for cross-coupling said first and second sections into a bistable configuration; and means, coupled in said primary current paths, for storing the state of said bistable circuit at the time of application of a write signal and for switching said circuit to said stored state upon application of a read signal.

2. The device of claim 1 wherein said storing means includes a pair of nonvolatile semiconductor memory devices each of which can assume at least a first and a second stable, nonvolatile state, with a different one of said memory device coupled in each of said primary current paths.

3. The device of claim 2 further comprising means for selectively coupling an erase signal to said nonvolatile semiconductor memory devices to place said memory devices in a preselected one of said first and second stable, nonvolatile states.

4. The device of claim 3 further comprising means for coupling a logic control signal to said memory devices during periods of operation of said circuit other than during write, read and erase periods, so that in response to the logic control signal the state of said circuit is controllable by said trigger signals.

5. The device of claim 2 wherein said memory devices each include a field-effect transistor having a gate electrode and a substrate with a dielectric material disposed between the gate electrode and the substrate which exhibits nonvolatile memory characteristics in response to electric fields applied across said dielectric material.

6. The device of claim 5 wherein said dielectric material comprises a layer of silicon-nitride.

7. The device of claim 5 wherein each said primary current path includes a different resistive device; and said memory devices each have an output element and an input element series coupled between a signal-translating device and a resistive device in a different one of said primary current paths.

8. The device of claim 2 wherein each said current path includes a pair of resistive devices; and each memory device has an input element and an output element series connected in a different one of said primary current paths between the resistive devices of one of said pair of resistive devices.

9. The device of claim 8 wherein each said memory device has a gate element, and said circuit further includes means for coupling read, write and erase pulses to the gate element of each said memory device; whereby in response to the erase pulses the impedance-threshold voltage characteristics of each said memory device are substantially independent of the state of said first and second circuit sections.

10. The device of claim 9 including means for coupling a logic control signal to the gate element of each said memory device during the periods of operation of said bistable circuit other than during write, read or erase periods; whereby the application of said logic control signal allows said bistable circuit to be switched to a selected one of its two stable states in response to the trigger signals.

11. The device of claim 10 wherein each said memory device includes a field-effect transistor having a substrate with a dielectric material disposed between the gate element and the substrate; whereby said memory devices exhibit nonvolatile memory characteristics in response to write signals applied across the dielectric material.

12. The device of claim 11 wherein said dielectric material comprises a layer of silicon-nitride.

13. The device of claim 2 further comprising means for electrically bypassing each of said memory devices during selected time periods of operation of said circuit.

14. The device of claim 2 further comprising a pair of switching devices, with one of said switching devices coupled across each of said memory devices; and means for controlling said switching devices to effectively shunt said memory devices during selected periods of operation of said circuit.

15. The device of claim 13 wherein said memory devices each includes an insulated-gate field-effect transistor having a gate electrode and a substrate with a dielectric material disposed between the gate electrode and the substrate which exhibits nonvolatile memory characteristics in response to electric fields applied across said dielectric material.

16. The device of claim 15 wherein said dielectric material comprises a layer of silicon-nitride.

17. The device of claim 15 wherein each said current path includes a resistive device, and each said memory device includes an input element and an output element, said last-named two elements of each memory device being coupled between a signal-translating device and the corresponding resistive device in the associated primary current path; and said circuit further including means for coupling said read, write and erase pulses to the gate electrodes of each said memory device.

18. The device of claim 14 wherein each said signal-translating device and each said switching device comprise a metal-oxide-silicon insulated-gate field-effect transistor; and each said memory device includes a metal-nitride-silicon insulated-gate field-effect transistor.

* * * * *